Jan. 6, 1948.  B. E. LUBOSHEZ  2,434,172
INEXPENSIVE MONOBLOC RANGE FINDER
Filed May 2, 1945  2 Sheets-Sheet 1
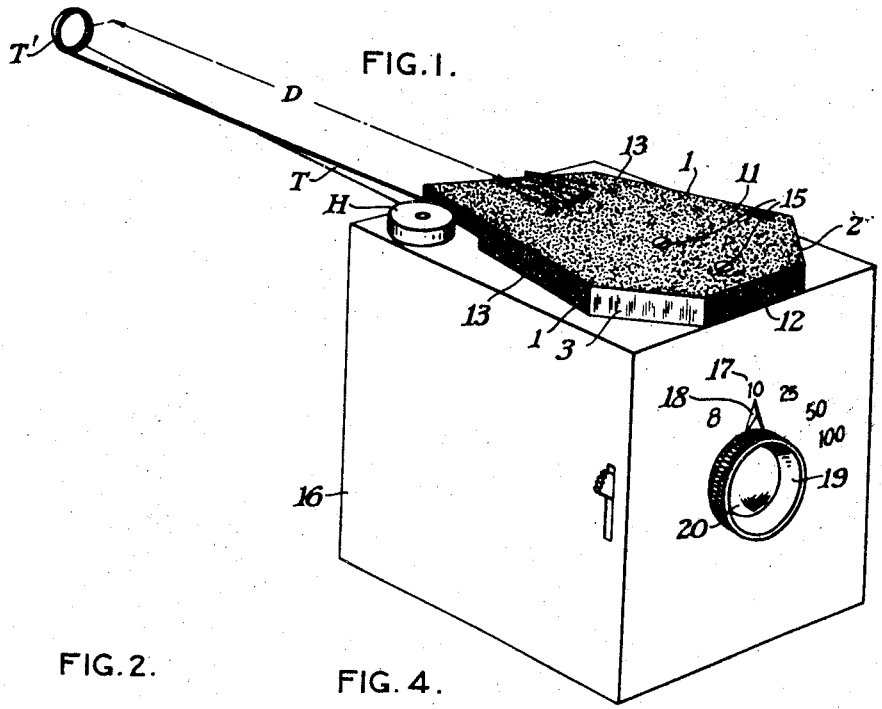
FIG. 1.
FIG. 2.
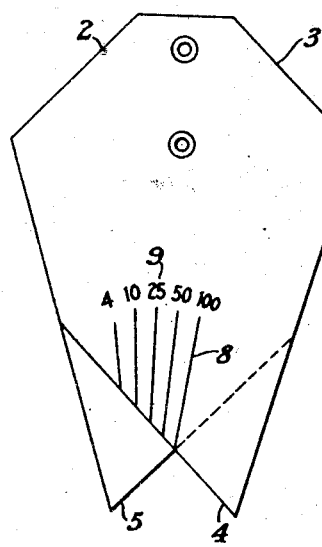
FIG. 4.
FIG. 5.
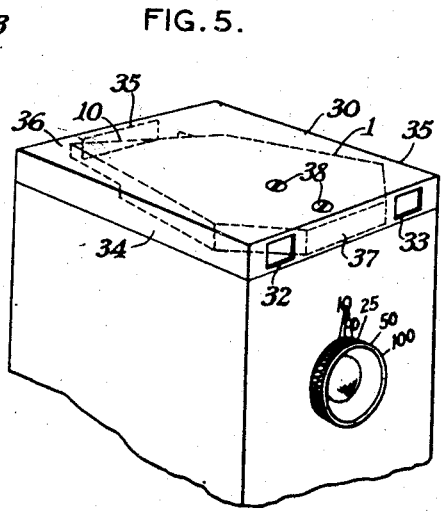
FIG. 3.
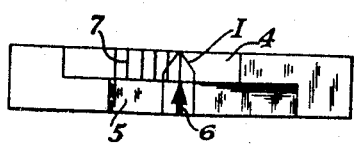
BENJAMIN E. LUBOSHEZ
INVENTOR
BY
ATTORNEYS Jan. 6, 1948.  B. E. LUBOSHEZ  2,434,172
INEXPENSIVE MONOBLOC RANGE FINDER
Filed May 2, 1945  2 Sheets-Sheet 2

BENJAMIN E. LUBOSHEZ
INVENTOR
BY Newton M. Perrins,
Donald H. Stewart,
ATTORNEYS Patented Jan. 6, 1948

2,434,172

UNITED STATES PATENT OFFICE 2,434,172

INEXPENSIVE MONOBLOC RANGE FINDER

Benjamin E. Luboshez, Rochester, N. Y., assignor to Eastman Kodak Company, Rochester, N. Y., a corporation of New Jersey Application May 2, 1945, Serial No. 591,503

3 Claims. (Cl. 88—2.6)

This invention relates to range finders particularly adapted for use in photography. One object of my invention is to provide a range finder without movable parts with which an operator may obtain various focal distances for focusing a camera. Another object of my invention is to provide a range finder of a single piece of material which can be made inexpensively and which can be used either as a part of a camera or as a range finder separate therefrom. Other objects will appear from the following specification the novel features being particularly pointed out in the claims at the end thereof.

In the past range finders have been usually provided only on the more expensive cameras and, since the usual types of range finders which have been used for photography require that the parts be made with a high degree of accuracy in order to produce accurate results, such range finders have been uniformly expensive. The camera range finders now in use, so far as I am aware, all use mirrors or prisms and, in many instances lenses, to produce on either a split field or on an overlapping field a pair of images which may be brought into registration to indicate various focal distances. Such range finders, while extremely desirable, are nevertheless so expensive that they are not suitable for inexpensive cameras.

One of the primary objects of my invention is to provide an extremely inexpensive range finder which is, nevertheless, so constructed that various focal distances can be quickly and accurately obtained and one in which, since there are no moving parts, an operator may read the focal distances directly from a scale.

Such a range finder may conveniently be made of a single block of light refracting material. While glass may be used, I nevertheless prefer to use some of the clear plastics which are now on the market because I have found that a number of these plastics can be molded with a sufficiently high degree of accuracy to fulfill the requirements for my proposed monobloc range finder which will be hereinafter described.

This application is a continuation-in-part of my application for Inexpensive range finder, Serial No. 487,914, filed May 21, 1943, now abandoned.

Coming now to the drawings wherein like reference characters denote like parts throughout:

Figure 1 is a perspective view of an inexpensive range finder constructed in accordance with, and embodying a preferred form of my invention, this range finder being shown as mounted on a box camera;

Figure 2 is a top plan view of the inexpensive range finder shown in Figure 1 but removed from the camera;

Figure 3 is an end elevation of the range finder shown in Figure 2;

Figure 4 is a side elevation of the range finder shown in Figure 2;

Figure 5 is a fragmentary detail perspective view showing a different installation of a range finder on an inexpensive type of camera;

Figure 6:
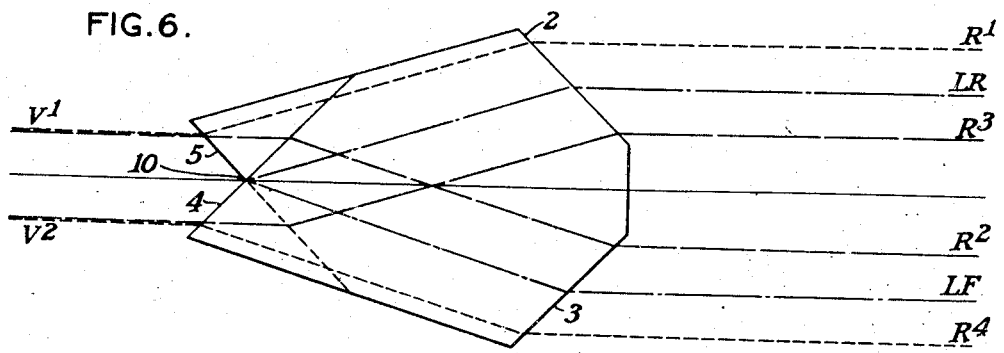
Figure 6 is a diagrammatic view showing the path of certain light rays through a preferred form of monobloc range finder.

My range finder consists preferably of a single block of light refracting material having angularly dispersed pairs of parallel surfaces thereon so arranged that two of these surfaces form light entrance faces and two of the surfaces form light exit faces, the two latter faces being arranged in overlapping relationship to form a split field. As indicated in Fig. 2, the single block of light refracting material may be a single glass prism 1 having a pair of light entrance faces 2 and 3 and a pair of light exit faces 4 and 5, the faces 2 and 5 being parallel and the faces 3 and 4 being parallel. The faces 4 and 5 are positioned one over the other in the overlapping relationship shown so that a split field is provided by the faces 4 and 5. One of these faces here shown as 5 is preferably provided with a central pointer 6 and the other of these faces 4 is here shown as being provided with a series of lines 7 forming, with the extension of these lines 8 and the numerals 9, a focusing scale.

The monobloc finder has the angles of the respective faces 2 and 4 and 3 and 5 so positioned and arranged that light rays—LR and LF, Figure 6, entering from an object at infinity will be deflected and will come into registration on the split field designated broadly as 10, so that the two positions of the image 1 may be registered in alignment on the pointer 6 as shown in Figure 3. Figure 6 also shows that bundles of rays may enter the entrance faces 2 and 3 and these rays will be parallel in both entering and leaving the exit faces of the prism. For instance, the rays R1 and R2 may enter the entrance faces 2 and 1 and may be in substantial registration along the line V1. Likewise, rays R3 and R4 may enter the entrance faces 2 and 3 and may be viewed along the line V2 in substantial registration as they leave the exit faces 4 and 5. Since different bundles of rays enter the entrance faces 2 and 3, it is possible to use different pairs of rays for range finding and it is possible to use rays which cross over in the prism as shown in Figure 7 for focusing on objects closer than infinity.

Figure 7:
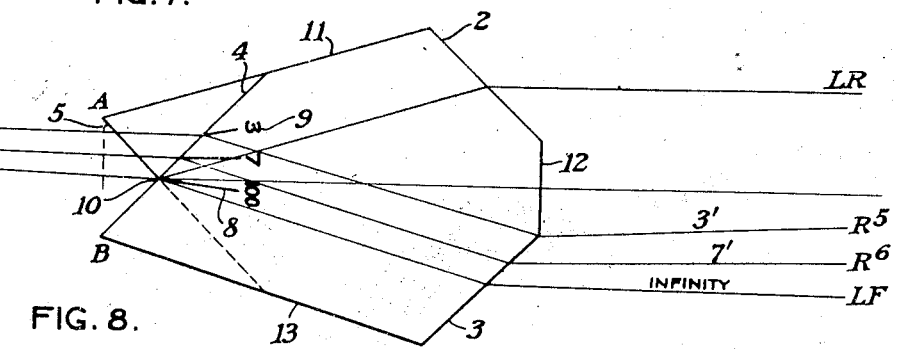
Figure 7 is a view similar to Figure 6 but with different light rays shown after passing through the same monobloc range finder.
Figure 8:
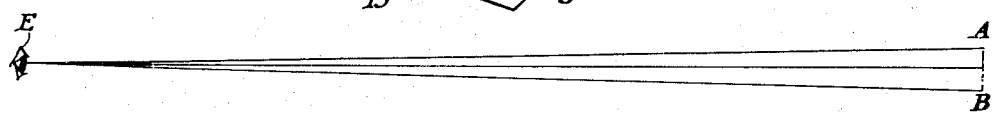
Figure 8 shows light rays passing from the exit faces of the range finder shown in Figure 7 to the eye of an operator.

In Figure 7 the ray LR is a ray from infinity which can be brought into registration with the intersection pointer or line on one exit face 5. The ray R5, from an object at say three feet from the camera, will be deflected to the exit face 4 after having crossed over the ray LR which may be considered as also coming from an object at three feet (or any other desired focal distance). As these rays LR and R5 approach entrance faces 2 and 3 they are diverging and consequently since they cross and pass out of the exit faces 4 and 5 they become converging, and, as illustrated in Figure 8, they will meet at a given point behind the prism. R6 shows a ray approaching from seven feet. The lines A—B of Figures 7 and 8 are section lines. In the Figure 7 form there will be considerable spacing between the footage markings 8 of the scale 9 as is very desirable.

As mentioned above, the ray LR may be considered as coming from an object at any distance because I prefer to measure distance by registering one image (as, for instance, one edge of the object being focused upon) with the arrow 6 which is on the infinity line so that the distance may be read off on the scale 7 directly. Therefore, the ray LR may be considered as coming from either infinity or any closer distance as obviously a portion of the image may be made to register with the pointer 6, merely by turning, or slightly rotating, the prism 1 in its own plane. Thus, in order to measure the distance of an image closer than infinity, one of the images may be brought into registration with the pointer 6 by rotating the prism slightly, or by the operator shifting his point of view from a position in which the two images lie one on each side of the pointer 6 to a position in which one of the images will lie in register with the pointer 6. This comparatively slight displacement of the images can be made to occur with but little movement of the prism, and the distance can then be read off the scale 9. However, it would, of course, be possible to provide scales reading away from the infinity mark in both directions with the same graduations on each side so that it would not be necessary to register one portion of the image with the infinity mark. I prefer, however, the first-described embodiment.

It is, of course, possible to make my proposed range finder of glass but in this case it is desirable to make the range finder of two pieces of glass since it is difficult to obtain suitable refracting surfaces 2, 3 and 4, 5 without actually grinding and polishing these surfaces. The finder may be made in two pieces, each only as thick as each half of the split field since, of course, only that part of the image which is seen through the refracting surface 3 and which is as high as the image formed on the surface 5 is utilized, even if the refracting surface is of the entire thickness of the block as shown in Fig. 4.

I prefer, however, instead of using glass, to use a more readily moldable material and there are a number of suitable clear plastics on the market which can be used. I have found that the surfaces 2, 3 and 4, 5 can be molded with sufficiently accurate surfaces to give perfectly satisfactory results and when molded in this manner it is convenient to make the range finder in one block as shown in Figs. 1 to 4, inclusive. When so made it is also possible to mold in the lines which form the distance scale and, if desired, these can be filled in with a suitable material to color or make the graduations more visible.

Whether the range finder is formed of plastic or other material, I find it desirable to leave all of those surfaces which are not used in refracting light slightly rough so that these surfaces may be covered with a light absorbing material which tends to prevent unwanted light from entering the prism. Thus, as indicated in Fig. 1, the top 11, the front 12, the side walls 13 and the plane surfaces 14 may all be sprayed or otherwise coated with a dull black paint or lacquer which may have any other type of decorative coating covering this coating if desired. The surfaces 2, 3 and 4, 5 will, of course, be highly polished and will not be coated with the light-absorbing material.

A range finder such as described may either be used on a camera 16 by attaching it with a pair of screws 15 or the range finder may be used as a pocket range finder and used to measure the distances of objects being photographed as a separate part. If attached to a camera 16, the camera should be provided with a focusing scale 17 so arranged that, by setting the pointer 18 of a focusing mount 19 for an objective 20 to the focal setting indicated on the range finder, the object being photographed will be properly focused.

In some instances it may be desirable, instead of coating the prism 1 with a non-reflecting coating as described above, to provide a complete housing for the range finder. This is shown in Fig. 5 wherein the prism 1 is enclosed in a housing 30 having a pair of windows 32 and 33 in the front wall 31 and having a single view window 35 through which the split field 10 can be viewed. This metal or plastic housing may have side walls 34 and 35, a rear wall 36 and a bottom wall 37. If the parts are thus enclosed, it is not necessary, although it may sometimes be desirable, to coat the non-refracting walls of the prism 1 with a light-absorbing medium.

As in Fig. 1 the range finder of Fig. 7 may either be attached to the camera by a pair of screws 38 or the range finder enclosed in the housing 30 may be used as a separate part for obtaining the focal distances of objects being photographed.

In Fig. 1 the camera designated broadly as 16 may be provided with a means for positioning an operator's eye at the most convenient distance for viewing. This may consist of a spring-operated tape T mounted in a housing H and having a ring T' on the end which defines the viewing distance D.

From the above description it will be noted that, in its simplest monobloc plastic form, my range finder can be manufactured at exceedingly low cost. It requires no moving parts. There is nothing to assemble unless the prism in placed in some form of closure, such as indicated in Fig. 5, and even here there are no accurate adjustments required since all that is necessary is dropping the prism in the box in which it is enclosed. A large part of the cost of most range finders is the assembling and the accurate positioning of the parts, one or more of which is moved to bring an object into alignment or overlapping relationship in the usual split field or coincident field types of range finders. My range finder does not use any such adjustments.

It might be noted that, while I have shown in Figs. 1 and 5 a range finder which is comparatively large in size, I have done this simply because my range finder is particularly adapted for inexpensive box types of cameras and it is convenient to make the range finder of such a size. However, it is obvious that the range finder prism may be made of any dimensions required although, of course, it is usually desirable to obtain as much space as possible between the two light entrance faces 2 and 3 as it is easier to obtain accurate results with well spaced light entrance faces.

While I have shown and described preferred embodiments of my invention, it is obvious that my range finder can readily be made in different dimensions and shapes without departing from my invention as defined in the following claims.

I claim:

1. A range finder comprising means for directly viewing in a comparison position split images of a single object comprising a single piece of light refracting material of greater length than width forming a prism, means for positioning the prism at a fixed distance from the eye of a user, two oppositely and angularly-disposed light entrance faces spaced apart at one end for receiving spaced diverging images of the same part of an object and for bending the light rays into intersecting relationship, two angularly arranged light exit faces parallel one to one light entrance face and the other to the other light entrance face for receiving the intersecting light rays, each light exit face having approximately half the thickness of the refracting material and the plane of one light exit face extending across the plane of the other light exit face whereby the two light exit faces may form a split field, a pointer on one light exit face at the intersection of the planes of the two light exit faces and a scale on the other light exit face whereby the separation of two images of an object on the light exit face may be measured between the pointer and scale to determine the distance of the object.

2. A range finder comprising means for directly viewing in a comparison position, split images of an object comprising a single piece of light-refracting material provided with two spaced angularly-disposed light entrance faces extending from a front wall in a rearward direction to bend entering light beams toward each other into intersecting relationship and toward a pair of light exit faces, one overlying the other in intersecting planes forming split images, means for holding the range finder at a known distance from the eye of an observer, a scale and pointer carried by the range finder for determining the registration or the degree of lack of registration of the images on the two light exit faces.

3. A range finder comprising means for directly viewing in a comparison position, split images of an object comprising a single piece of light-refracting material provided with two spaced angularly-disposed light entrance faces extending from a front wall in a rearward direction to bend entering light beams toward each other into intersecting relationship and toward a pair of light exit faces, one parallel to one entrance face and the other parallel to the other entrance face, said second light exit faces lying one above the other in intersecting planes so that the two images may appear in the comparison position, one above the other, means for holding the range finder at a known distance from the eye of an observer to view the split images, and a pointer and scale carried by the range finder and viewable with the light exit faces for determining the separation of the two images and consequently the distance of the object being viewed.

BENJAMIN E. LUBOSHEZ.

REFERENCES CITED

The following references are of record in the file of this patent:

UNITED STATES PATENTS

| Number | Name | Date |
| --- | --- | --- |
| 1,033,849 | Washburn | July 30, 1912 |
| 1,309,174 | Barr et al. | July 8, 1919 |

FOREIGN PATENTS

| Number | Country | Date |
| --- | --- | --- |
| 359,745 | Germany | Sept. 26, 1922 |
| 342,658 | Germany | Oct. 22, 1921 |
| 28,677 | Switzerland | May 11, 1903 |
| 166,179 | Great Britain | July 11, 1921 |
| 247,606 | Great Britain | July 22, 1926 |